United States Patent Office 3,296,856
Patented Jan. 10, 1967

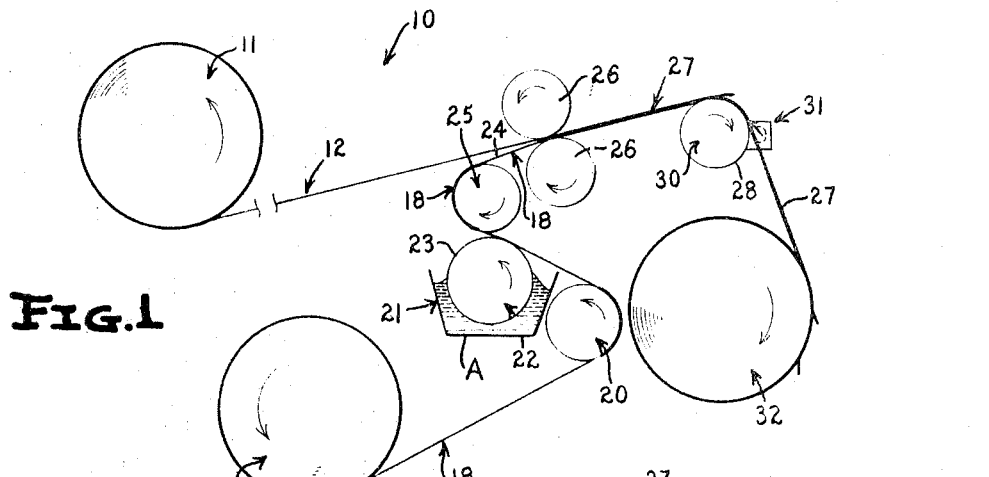
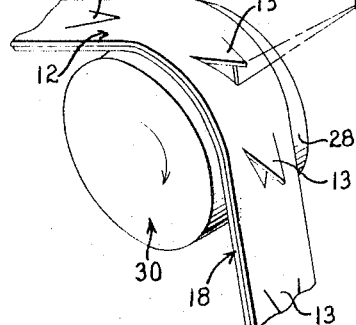
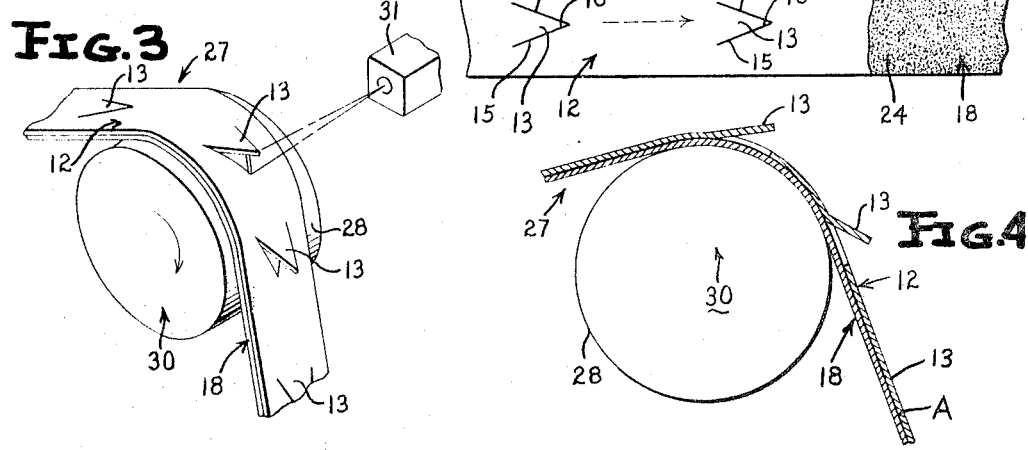
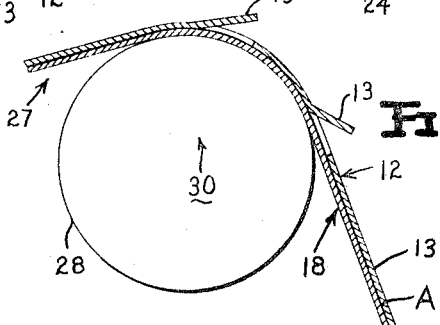
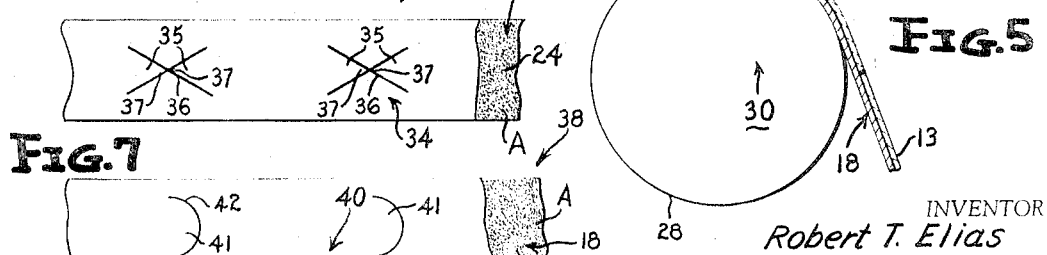
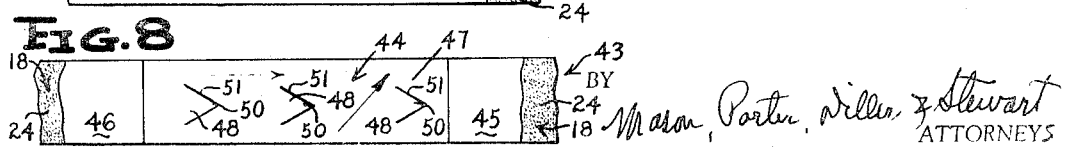

3,296,856
TESTING DEVICE FOR ADHESIVES
Robert Theodore Elias, Downers Grove, Ill., assignor to Continental Can Company, Inc., New York, N.Y., a corporation of New York
Filed Apr. 17, 1963, Ser. No. 273,639
14 Claims. (Cl. 73—150)

This invention relates to a novel testing device for determining the "tack" or degree of bond of an adhesive, and in particular, to an adhesive tack tester which utilizes the tendency of a plurality of portions of one of two adhesively bonded relatively bendable members to break the bond when the members are bent.

Various tack testing devices for determining the tack or degree of bond of adhesive and of adhesive-substrate combination are known. One such tack testing device involves the manual application of an adhesive between two surface of a pair of members, after which the two surfaces are brought together by hand and the adhesive is permitted to set. The time of setting is determined by a stop watch manually controlled by an operator. After a predetermined period of time the pair of members is subjected to a predetermined load or a load which is rapidly increased to a point at which the adhesive bond fails.

Other tact testing devices utilize an electric timer to signal successive manual operations or require the use of a force meter to measure the degree of bond of the adhesive.

In all of these tack testing devices great care must be used in controlling the amount of adhesive utilized during the testing operation as well as the area of adhesive contact. The operator must necessarily be skilled to perform the manual operations required within certain time periods, and no matter how skilled the operator may be, he cannot reproduce his results with precision when time periods of one second or less are required during the testing of an adhesive.

The term "tack" is used to imply the stickiness or the degree of bond of an adhesive at some particular time of interest between the time at which the adhesive is applied to a surface and the time at which the bond strength of the adhesive is at a maximum. That is, "tack" is the sticking or holding strength of an adhesive at some particular time of interest, short of maximum bond strength.

Very few adhesives exhibit their maximum bond strengths at the instant of first contact between surfaces upon which the adhesives are applied. It is far more typical that the strengths of bonds increase with time after the first contact between the surfaces up to eventual maxima. The tackiness or degree of bond may be graphically illustrated by plotting the bond strength of an adhesive against time. Depending upon the adhesive formulation, temperature, etc., as well as upon the substrates upon which the adhesives are applied, the various adhesive bonds may produce entirely different bond-strength versus time graphic representations. One bond may be fairly strong at the time of initial application, and another quite weak at this time, yet both bonds eventually reach strengths which are substantially equal. One bond may approach its maximum strength almost asympototically, while another bond may strengthen slowly at first but gradually accelerate until the maximum bond strength is achieved.

The tackiness or degree of bond at a particular time during a manufacturing operation is of great importance, as it often determines whether a subsequent production step or operation may be safely undertaken. This subsequent operation might be performed by a machine which could possibly break or rupture an adhesive joint of an article if the adhesive has not yet attained a particular or sufficient strength. Alternatively, this subsequent operation might be merely the removal of clamping pressure from an adhesively bonded article prior to its storage or shipment, in which case the bond must not yield to built-in stresses of the article or mishandling of the article. In either of these cases, the time available for tack development may be quite short. High-speed machines frequently do not have the capacity to store under pressure the relatively great amount of articles they produce in a relatively short period of time.

For example, if it were necessary in a paper cup machine to hold glued or adhesively bonded seams under clamping pressure for approximately one minute before a succeeding operation, the paper cup machine would necessarily and at all times have to hold approximately 125 cups under clamping pressure. This amount of cups held under clamping pressure is highly uneconomical and unfeasible at today's high-speed production rates.

Another example of the great importance of the degree of bond of an adhesive during a manufacturing operation is a winder for making spiral paper tubes. When a sufficient length of the tubing has been wound, it is cut off and by this time enough tack must have developed in the adhesive which is applied during the winding operation so that the paper will not begin unwinding at the newly cut end. Naturally, the stiffer the paper in terms of its tendency to spring back, the greater is the tack or degree of bond which is needed to prevent this unwinding. Similarly, the faster the machine is operating, the sooner this level of tack must be achieved. Conversely, the faster sufficient tack is developed, the faster the machine may be operated. Depending upon the article being produced and the rate of production thereof, the time allowed for tack development ranges from a few seconds down to 0.1 second and even much less. Thus, it should be readily apparent from the foregoing that an efficient tack testing device must be capable of precise operations at extremely short tack development times and variable production rates.

Therefore, an object of this invention is the provision of a novel tack testing device which overcomes the disadvantages of known tack testing devices and is capable of producing precise analytical determinations of the tack or degree of bond of an adhesive whatever may be the tack development time or the production rate.

A further object of this invention is to provide a novel tack tester or tack testing device which is capable of determining the tack or degree of bond of an adhesive applied between a plurality of relatively bendable members, at least one of the plurality of bendable members having a plurality of break away portions, the tack tester including first means for transporting the bendable members along a predetermined path and second means for altering the movement of the bendable members away from the predetermined path whereby the portions break away from the bendable members and the amount of such break away is indicative of the tack of the adhesive.

Another object of this invention is to provide a novel tack testing device including a first member carrying a strip of substantially bendable material having break away or shiftable portions formed therein, a second member carrying a second strip of substantially bendable material, means associated with the second strip for applying an adhesive thereto, means for uniting and overlaying the first and second substantially bendable strips, transport means for moving the united strips along a predetermined path and means for shifting or breaking away the portions of the strip carried by the first member whereby the degree or amount of such shifting or break away is indicative of the tack or degree of bond of the adhesive.

Another object of this invention is to provide a novel tack testing device of the type immediately above described wherein the means for uniting the first and second strips is adjustable relative to the shifting means for altering the length of the predetermined path and thereby alters the tack development time of the adhesive.

Still another object of this invention is to provide a novel tack tester of the type heretofore mentioned and including means between the adhesive applying means and the uniting means for varying the time between the application of an adhesive to the second strip and the uniting thereof with the strip of the first member whereby open or exposure time of the adhesive may be varied.

A further object of this invention is the provision of a novel tack testing device of the type above described wherein the means for shifting the plurality of shifting or break away portions of the strip carried by the first member includes a rotatable guiding surface upon which the united strips are moved causing the shifting or breaking away of the portions from the predetermined path.

Another object of this invention is to provide a composite tack test member including a first relatively bendable member, a second relatively bendable member and an adhesive bonding the first and second bendable members together, the first of the bendable members having at least one break away portion formed therein and said portion being coplanar with the first bendable member but being movable out of the plane of the first bendable member when the first and second bendable members are bent.

Another object of this invention is the provision of a novel composite tack test member of the type immediately above described wherein the break away portion formed in the first relatively bendable member is defined at least in part by a severance line.

Another object of this invention is to provide a novel method of determining the tack or degree of bond of an adhesive by adhesively bonding a relatively bendable member to a relatively bendable member having a plurality of break away portions and bending both members to cause the portions to break away with respect to at least one of the bendable members.

With the above, and other objects in view that will hereinafter appear, the nature of the invention will be more clearly understood by reference to the following detailed description, the appended claims and the several views illustrated in the accompanying drawings:

In the drawings:

FIGURE 1 is a schematic elevational view of a tack testing device constructed in accordance with this invention, and illustrates a first roll feeding a first strip of substantially bendable material having a plurality of break away portions formed therein between a pair of rolls, a second strip of relatively bendable material being fed from a second roll over an adhesive applying roll toward and between the pair of rolls, the pair of rolls uniting the first and second strips, the united first and second strips passing over a test roll causing the portions of the first strip to break away from the plane of the first strip, a detector adjacent the test roll for determining the amount of break away and a rewind roll about which the united first and second strips are rewound.

FIGURE 2 is a fragmentary top plan view of the first and second relatively bendable strips after the same have been united or combined by the pair of rollers, and illustrates the plurality of break away portions of the first strip and the general configuration thereof.

FIGURE 3 is a fragmentary side perspective view of the test roll of FIGURE 1, and illustrates the position of a pair of the break away portions of the first strip as the strips are bent about a peripheral surface of the testing roll.

FIGURE 4 is a fragmentary vertical sectional view through the testing roll and strips or FIGURE 3, and shows the degree of break away of the break away portions as the strips are conveyed about the periphery of the testing roll.

FIGURE 5 is a fragmentary vertical sectional view similar to the strips and testing roll of FIGURE 4, but illustrates the failure of a plurality of break away portions of the first strip to break away from the second strip as the strips are transported about the periphery of the testing roll.

FIGURE 6 is a fragmentary top plan view of a pair of adhesively bonded relatively bendable strips similar to the strips of FIGURE 2, and illustrates a pair of X-shaped break away portions in a first strip, each of the portions being formed by a pair of crossed severance lines.

FIGURE 7 is a fragmentary top plan view of a pair of relatively bendable strips, such as the strips of FIGURE 6, and shows a pair of semi-circular break away portions in a first strip, each of the portions being formed by a single arcuate severance line.

FIGURE 8 is a fragmentary top plan view of another pair of relatively bendable strips, and shows a first strip which includes a test strip inserted between a spliced leader strip and a plurality of angular break away portions in the test strip.

Referring now to the drawings in particular, a tack testing device or tack tester is illustrated in FIGURE 1 of the drawings and is generally designated by the reference numeral 10. The tack tester 10 includes a first member 11 which is preferably a feed roll or spool which is freely rotatable and about which is wound a first relatively bendable member or test strip 12. The first relatively bendable member or test strip 12 is preferably constructed from paper stock material which is provided with a plurality of spaced chevron-shaped break away or shiftable portions 13, as is best illustrated in FIGURE 2 of the drawings. Each of the break away portions 13 is formed from the material of the first bendable strip 12 by severing the same along converging lines of severance 14 and 15. The break away portions 13 are generally triangularly contoured with an apex 16 of each of the break away portions being directed toward the direction of the path of travel of the first bendable strip 12, as indicated by the broken arrow in FIGURE 2.

A second member 17 which is preferably freely rotatable roll or spool underlies the first rotatable member or spool 11. A second relatively bendable member or base strip 18 is wound about the second rotatable roll 17 and fed therefrom toward a freely rotatable idler roll 20. The second or base strip 18 is preferably constructed from paper stock material, but may be constructed from any such other suitable bendable material as leather, plastic or cloth.

An adhesive A, the tack or bond of which is to be determined by the tack tester 10, is confined in a vat 21. An adhesive applying roll 22 having a peripheral surface 23 is freely rotatably mounted in the vat 21. After the second or base strip 18 is drawn about the idler roll 20, it contacts the peripheral surface 23 of the adhesive applying roll 22 and a surface 24 (see FIGURE 2) of the second or base strip 18 is coated with the adhesive A.

After the second or base strip 18 has been coated with the adhesive A, it is drawn about a freely rotatable idler roller 25 which is adjustable in a manner and for a purpose to be hereafter described more fully.

After the second or base strip 18 leaves the idler roller 25 it is drawn toward, between and through a pair of rotatable combining or uniting rolls 26 together with the first strip 12. The uniting or combining rolls 26 force the adhesive coated surface 24 of the second or base strip 18 into intimate contact with the first strip 12. The uniting or combining rolls 26 are adjustable in a manner and for a purpose to be more fully described hereafter.

As the first bendable member or test strip 12 and the second or base strip 18 are drawn outwardly from between the combining rolls 26 they form, in effect, a composite tack test strip 27. This composite tack test strip 27 is transported or drawn from the pair of combining rolls 26 along a substantially planar predetermined path toward and about a periphery 28 of a testing roll 30. As the composite tack test strip 27 is conveyed about the periphery 28 of the test roll 30, as is best illustrated in FIGURE 3 of the drawings, the plurality of triangular break away portions 13 of the first strip 12 tend to break away from the adhesive A on the surface 24 of the second or base strip 18. The amount or degree that the break away portions 13 break away from the second or base strip 18 is a direct indication of the tack or degree of bond of the adhesive A. That is, the greater the degree or amount of break away of the portions 13, the lesser is the tack or degree of bond of the adhesive A. Conversely, the lesser the break away of the portions 13, the greater is the tack or degree of bond of the adhesive A.

The tendency of the break away portions 13 of the first strip 12 to break away or shift out of the plane of the composite tack test strip 27 as it passes about the periphery 28 of the test roll 30 is influenced by various factors. The stiffness of the material from which the first strip 12 is constructed, the radius of the test roll 30 and the centrifugal force tending to throw the break away portions 13 outwardly as they pass about the periphery of the testing roll 30 all directly influence the break away tendency of the adhesive A. Similarly, the amount of time which the adhesive A is allowed to "set" or the amount of time which the adhesive is exposed to the atmosphere after being applied to the surface 24 of the base strip 18 directly influences the amount of breakaway of the portions 13 as the composite tack test strip 27 is bent about the periphery of the roller 30. The operational speed of the tack tester 10 also influences the break away of the break away portions 13.

However, for each adhesive which reaches its maximum bond strength in a dissimilar manner, a different degree or amount of break away of the portions 13 will be evidenced as the respective composite strips between which the adhesives are applied are bent about the periphery 28 of the test roll 30. That is, in the embodiment of the invention disclosed in FIGURE 1, a first adhesive applied to the surface 24 of the base strip 18 may cause the portions 13 to break away a predetermined degree if the adhesive has not reached its maximum bond strength before being bent about the test roll 30. Another adhesive of a lesser bond strength than the first adhesive, when applied to the surface 24 of the base strip 18 will exhibit a greater amount or degree of break away than the first adhesive when bent about the periphery 28 of the test roll 30. Thus, the amount or degree of break away of the break away portions 13 of the first strip 12 is a direct indication of the tack or degree of bond of any particular adhesive forming a portion of the composite tack test strip.

Various different means may be employed to determine the amount or degree of break away of the break away portions 13 from the composite tack test strip 27 as the same is bent about the periphery 28 of the test roll 30. For example, if the break away portions 13 are evenly spaced along the length of the composite tack test strip 27, a stroboscope 31 may be used. Alternatively, a detecting finger could be positioned adjacent the composite tack test strip as it leaves the periphery 28 of the test roll 30 for running contact with the apices of the break away portions 13 when the break away portions 13 project outwardly beyond the plane of the first strip 12 a specific amount.

It is, however, not always necessary to employ a detector to determine whether a sufficient tack or degree of bond of a particular adhesive is attained in a particular length of time. That is, a primary function of the tack tester 10 is to accurately determine whether a succeeding production operation may be safely undertaken after an adhesive applying operation has been performed upon an article to form an adhesive or glued joint, and this determination can sometimes be made by a visual inspection of the composite tack strip 27 as it leaves the periphery 28 of the test roll 30 in the manner immediately below described.

By varying the distance between the idler roll 25 and the pair of uniting or combining rolls 26 the "open" time of the adhesive A can be varied. This "open" time is the time between which the adhesive A is first applied by the adhesive applying roll 23 to the surface 24 of the second or base strip 18 and the time at which the base strip 18 enters the nip of the uniting or combining rolls 26. In actual production, the "open" time corresponds to a first production operation which applied adhesive to an article and a succeeding production operation which places the article in contact with another article or component which is to be bonded thereto. If for example there is a one-tenth second interval between the above mentioned production operations, the distance between the idler roll 25 and the pair of combining or uniting rolls 26 can be adjusted to provide a one-tenth second "open" time interval. Since a one foot distance is traversed in one-tenth of a second at a linear velocity of 600 feet per minute, either the distance between the idler roller 25 and the pair of uniting or combining rolls 26, or the speed of the tack tester 10 or both the distance and the speed may be varied to achieve this one-tenth "open" time interval.

The time it takes the composite tack test strip 27 to travel along the predetermined path between the pair of combining or uniting rolls 26 and the testing roll 30 corresponds to the time required for an article having an adhesive or glued joint to travel to a production operation which might break the adhesive joint if it had not yet attained sufficient tack or degree of bond. Once again, the particular time interval required in the production line to traverse this distance may be duplicated by the tack tester 10 by spacing the combining or uniting rolls 26 with respect to the testing roll 30, the speed of the tack tester 10 or both the distance and the speed. If the break away portions 13 of the composite tack test strip 27 break away at the periphery 28 of the test roll 30, the tack or degree of bond of the adhesive is insufficient to perform the above-mentioned production operation which would break an adhesive or glued joint and this production operation cannot be safely undertaken. However, if the break away portions 13 conform to the configuration of the composite tack test strip 27 as it bends about the periphery 28 of the test roll 30, as shown in FIGURE 5, a succeeding production operation may be safely undertaken since the adhesive has developed a sufficient tack or degree of bond to withstand an operation which might otherwise break an adhesive or glued joint. Thus, a detector such as the detector 31 is unnecessary to determine the tack or degree of bond of an adhesive and it is merely necessary to visibly observe whether or not the break away portions 13 of the composite tack test strip 27 break away or do not break away about the periphery 28 of the test roll 30.

The composite tack test strip 27 is transferred from the test roll 30 to a rewind roll 32 which is driven by a variable speed motor (not shown). The composite tack test strip 27 is, of course, rewound about the rewind roll 32 which forces the break away portions 13 back into the plane of the first strip 12. If the adhesive under test does not have the property of "re-tacking," i.e., of re-adhering though once broke or pulled away, the break away portions 13 may be examined at a later time after being unwound from the rewind reel 32.

A composite tack test strip 33, illustrated in FIGURE 6 of the drawings, is substantially identical to the composite tack test strip of FIGURE 2 and includes a second or base strip 18 having a surface 24 upon which an adhesive A which is to be tested is applied. The second or base strip 18 of the composite tack test strip 33 is preferably constructed from paper stock material, but may be made from any relatively bendable material such as leather, plastic or cloth.

A first relatively bendable member or test strip 34 overlies and is secured to the second or base strip 18. The first strip 34 is preferably constructed from paper stock material and includes a plurality of break away portions 35 formed integral therewith and spaced evenly along the length of the first strip 34. The break away portions 35 are each formed by a X-shaped severance line 36 which form oppositely directed apices in each of the break away portions 35.

When the composite tack test strip 33 is bent, an insufficient amount of tack or degree of bond allows the portions 35 to break away from the plane of the composite tack test strip 33 in a manner identical with that heretofore discussed in connection with FIGURES 1 through 4. However, an included angle is formed by each of the portions 35 when they break away from the plane of the plane of the composite tack test strip 33 and the tack or degree of bond may be determined by measuring this included angle.

In FIGURE 7 of the drawings, another composite tack test strip 38 is illustrated. The composite tack test strip 38 includes a second or base strip 18 which is constructed from paper stock, plastic, cloth or leather material. The second or base strip 18 has an adhesive A applied to a surface 24 thereof.

A first bendable member or test strip 40 of paper stock material overlies and is secured to the adhesive surface 24 of the second or base strip 18. The first strip 40 includes a plurality of integral break away portions 41 which are preferably evenly spaced along the length of the composite tack test strip 38. The break away portions 41 are each formed by an arcuate severance line 42. The function of the composite tack test strip 38 is substantially identical to the function of the composite tack test strip 27 of FIGURES 1 through 4, and a description thereof is deemed unnecessary.

It was previously noted that the tendency of the break away portions 13, 35 and 41 to break away from the respective composite tack test strips 27, 33 and 38 is influenced to a major extent by the stiffness or the tendency of the break away portions to spring-back. This spring-back is very important in the production of spirally wound paper tubes because the freshly cut ends of the tubes tend to straighten out instead of following the curve of the tube surface. The direction of the grain of the particular paper stock material forming the spirally wound paper tubes has a direct effect upon the degree of spring-back. Thus, for very precise determinations of the tack or degree of bond, the first strip of any one of the composite tack test strips heretofore disclosed should have the break away portions thereof and the grain direction corresponding to the actual grain direction at the freshly cut ends of the paper stock material from which the paper tubes are formed.

In FIGURE 8 of the drawings, a composite tack test strip 43 is illustrated, and this tack test strip 43 is constructed so that the grain direction of a first strip and a plurality of break away portions threof correspond to the actual grain directions and cut-off end portions of a spirally wound paper tube. The composite tack test strip 43 includes a second or base strip 18 having an adhesive A on a surface 24 thereof. The second or base strip 18 of FIGURE 8 is identical to the base strips of FIGURES 1 through 7.

A first bendable member or strip 44 of a bendable paper stock material is secured to the second or base strip 18. The first bendable member or strip 44 includes a leader strip 45, a follower strip 46, and a test strip 47 secured between the leader and follower strips by splicing. A plurality of break away portions 48 are formed in the test strip 47 and each includes an apex 50 directed toward the path of travel of the composite tack test strip 43, as indicated by the broken arrow of FIGURE 8. The break away portions 48 are equally spaced along the length of the test strip 47 and are formed by an angular severance line 51. The test strip 47 is constructed from paper stock material, the grain direction of which is indicated by the double-headed arrow in FIGURE 8. The break away portions 48 correspond to the portion of the spirally wound paper tubes at the freshly cut ends thereof which tend to straighten out rather than follow the curve of the tube surface while the grain direction corresponds to the direction of the grain of this paper stock material forming the tubes. Thus, the composite tack test strip 43 corresponds identically to the paper stock material employed to fabricate a spirally wound paper tube.

An advantage of the composite tack test strip 43 of FIGURE 8 lies in the fact that if one had only a short piece of the material he wished to test, it could be artificially lengthened by splicing it to a length of foreign material. Thus, while the test strip 47 may be paper stock material which is to be tested, the leader strip 45 and the follower strip 46 could be leather, plastic, cloth, canvas or similar material. The leader strip 45 assures that the composite test strip 43 will be accurately drawn through the tack tester 10 and the follower strip 46 insures control of the composite strip 43 after the test strip 47 has passed beyond the test roll 30.

The base strip 18 of FIGURES 1 through 8 could likewise be formed from a leader strip, a follower strip and a strip portion coextensive with and underlying the test strip 47. This would be advantageous when the material of the base strip 18 is in short supply.

This disclosure is also not intended to be limited to the configurations of the break away portions illustrated in FIGURES 2, 6, 7 and 8 of the drawings. It is intended to be within the scope of this invention to form a test strip having break away portions with square apices or tips, forked tips, serrated edges, slashed edges, wavy edges, stepped edges, reversed tapers, as well as double-cut tongues, i.e., two chevron shaped break away portions one inside the other with common base lines, or a chevron shaped break away portion inside a square shaped break away portion.

Depending upon how one wishes to study the stresses on an adhesive joint, he may, by changing the tongue shape, accentuate one or more types of stresses as being more representative of actual use conditions of an adhesive. For example, as the break away portion 13 in the plane of the composite tack test strip 27 of FIGURE 3 begins to bend about the peripheral surface 28 of the roll 30, this break away portion tends to shift or break away from the composite tack test strip 27 in the manner heretofore described. When this break away portion passes a point of tangency between the composite tack test strip 27 and the roll 30, a base line of unbroken glue or adhesive parallel to the axis of the roll 30 through the point of tangency is acted upon by centrifugal force. The centrifugal force tending to further separate the break away portion from the base strip 18 is a function of the shape of the flap which has already formed, and the strength of the adhesive line resisting further break away due to centrifugal force is a function of the length of this adhesive line (or a plurality of adhesive lines of a double-cut break away portion) which is affected by the centrifugal force.

As another example, if the break away portion 13 above-noted has not broken out of the plane of the composite tack test strip 27 but is partially beyond the point of tangency between the composite tack test strip 27 and the roll 30, the stiffness of the break away portion is fighting or resisting that area of the base strip 18 which already lies upon the periphery 28 of the roll 30. The relationship of the lifting force to the area adhered may be varied by changing the shape of the break away portions.

The tack testing device and the composite tack testing strips shown embody the invention in a preferred form, but it is intended that the disclosure be illustrative rather than definitive, the invention being defined in the claims.

I claim:

1. An apparatus for determining the tack or degree of bond of an adhesive applied between a plurality of relatively bendable members, at least one of the plurality of bendable members including a break-away portion comprising: first means for maintaining the bendable members in a first substantially, common planar condition, and second means for diverting all of the bendable members from said first substantially common planar condition into a second and different substantially common planar condition and for moving said break-away portion from said second planar condition whereby the degree of movement of the break-away portion with respect to said second planar condition is indicative of the tack of the adhesive.

2. The apparatus as defined in claim 1 wherein detecting means are positioned adjacent a point at which the moving of said portion occurs for determining the amount of said moving of the adhesive.

3. An apparatus for determining the tack of adhesive bonding together a plurality of relatively bendable members at least one member of which includes a break-away portion comprising: first means for moving the bendable members in a first predetermined plane, second means for diverting all of the bendable members from said first predetermined plane into a second different predetermined plane and for moving a break-away portion of one member out of said second predetermined plane, said second means including a guiding surface upon which said members are movable whereby the degree of movement of said break-away portion with respect to said second predetermined plane is indicative of the tack of said adhesive 4. The apparatus as defined in claim 3 wherein said guiding surface is a peripheral portion of a roller adjacent said predetermined planes.

5. An apparatus for determining the tack of an adhesive comprising: a first member bearing a first strip of substantially bendable material having breakaway portions formed therein, a second member carrying a second strip of substantially bendable material, adhesive applying means in contact with one of said strips for applying an adhesive thereto, uniting means for adhesively overlying said and second strips to form a composite strip, first means for moving said composite strip in a first predetermined plane and second means for diverting said composite strip from said first predetermined plane into a second different predetermined plane and for breaking away said portions from the second predetermined plane whereby the amount of break-away of said break-away portions is indicative of the tack of the adhesive.

6. The apparatus as defined in claim 5 wherein said first predetermined plane defines a first predetermined path, and said uniting means are adjustable for altering the length of said first predetermined path.

7. The apparatus as defined in claim 5 wherein means are provided between the adhesive applying means and the uniting means for varying the time between the application of adhesive to one of the strips and the uniting thereof to form the composite strip.

8. A composite tack test member for determining the tack of adhesive comprising a first relatively bendable member, a second relatively bendable member and an adhesive bonding said first and second bendable members together, one of said bendable members including means for indicating the tack of the adhesive bonding the members together upon said members being bent, said means including at least one integral break-away portion formed therefrom, said break-away portion being normally coplanar with said one bendable member in a first position at which said first and second bendable members occupy a generally common first plane, said break-away portion being normally non-coplanar with said one bendable member in a second position at which a portion of both of said first and second bendable members occupy a generally common second plane different from said first plane, and the break-away portion being adapted to be broken away from said one bendable member in said second position in an amount indicative of the tack of the adhesive bonding said first and second bendable members together.

9. A composite tack test strip as defined in claim 8 wherein said break-away portion is severed from the material of said one bendable member.

10. A composite tack test strip as defined in claim 9 wherein the material of said one bendable member has a definite grain direction and the position of the break-away portion is dependent in part upon the grain direction.

11. The composite tack test strip as defined in claim 9 wherein said one bendable member includes a leader strip, a follower strip and a test strip between the leader and follower strips, and said break-away portion is formed from said test strip.

12. A method of determining the tack of an adhesive comprising the steps of forming a laminated test specimen by adhesively bonding a first bendable member to a second bendable member, wherein said forming step includes severing break-away portions, and bending said laminated test specimen to break the adhesive bond between the break-away portions and the first bendable member and causing the break-away portions to shift from the plane of the laminated test specimen an amount indicative of the tack of the adhesive.

13. A method of determining the tack of a non-readhering adhesive comprising the steps of forming a plurality of bendable members, providing at least one of the plurality of bendable members with a plurality of break-away portions, forming a laminated test specimen by adhesively bonding said bendable members together, bending said laminated test specimen thereby shifting the plurality of break-away portions with respect to the bendable members forming said laminated test specimens to indicate the tack of the adhesive, repositioning the break-away portions to their original positions in said laminated test specimens, and subsequently again bending said laminated test specimens and shifting said break-away portions with respect to the bendable members to again indicate the tack of the adhesive.

14. A method of testing a preformed adhesive test specimen comprising the steps of: advancing a laminated test specimen by uniting an adhesive coated strip with a first strip wherein said first strip contains spaced cuts through its thickness, said cuts forming a free leading edge and a trailing attached portion, passing said laminated strip formed by said adhesive coated strip and said first strip over a direction changing means whereby the leading edge will provide an indication of the adhesion of the strips as they pass over said direction changing means.

References Cited by the Examiner

UNITED STATES PATENTS

| | | | |
|---|---|---|---|
| 2,473,517 | 6/1949 | Freedman | 73—150 |
| 2,732,712 | 1/1956 | Reed | 73—100 |
| 2,801,949 | 8/1957 | Bateman | 161—406 X |
| 2,823,672 | 2/1958 | Schladermundt et al. | 128—156 |
| 2,834,205 | 5/1958 | Pickup | 73—150 |
| 2,982,129 | 5/1961 | Wetzel et al. | 73—150 |
| 3,019,644 | 2/1962 | Mancini | 73—150 |
| 3,058,865 | 10/1962 | Dritz | 161—406 X |

FOREIGN PATENTS 402,870 6/1932 Great Britain.

RICHARD C. QUEISSER, *Primary Examiner.*

JOSEPH P. STRIZAK, *Examiner.*

LOUIS MOK, J. JOSEPH SMITH, *Assistant Examiners.*